United States Patent [19]

Silver et al.

[11] Patent Number: 5,499,335

[45] Date of Patent: Mar. 12, 1996

[54] METHOD AND SYSTEM FOR PROVIDING STANDARD RESOURCES IN DIFFERENT NATURAL LANGUAGES

[75] Inventors: David M. Silver, Bellevue; John R. Windsor, Redmond, both of Wash.

[73] Assignee: Microsoft Corporation, Redmond, Wash.

[21] Appl. No.: 426,645

[22] Filed: Apr. 21, 1995

Related U.S. Application Data

[63] Continuation of Ser. No. 110,862, Aug. 24, 1993, abandoned.

[51] Int. Cl.⁶ .................................................. G06F 3/14
[52] U.S. Cl. .................. 395/161; 395/157; 364/419.16
[58] Field of Search ................................. 395/155, 156, 395/157, 161; 364/226.4, 419.02, 419.03, 419.04, 419.16

[56] References Cited

U.S. PATENT DOCUMENTS

| | | | |
|---|---|---|---|
| 4,510,381 | 4/1985 | Fukatsu | 235/379 X |
| 4,593,183 | 6/1986 | Fukatsu | 235/379 X |
| 4,731,735 | 3/1988 | Borgendale et al. | 364/419.16 X |
| 4,870,610 | 9/1989 | Belfer | 364/419.02 X |

OTHER PUBLICATIONS

Microsoft Windows User's Guide (Trademark of Microsoft Corporation), 1990, pp. x, xii–xiii, xix, 25–31, 129–136 & 180–186.
Macintosh Human Interface Guidelines (Trademark of Apple Computer Inc.), 1992, pp. 17–23.
Deke McClelland; *Macintosh System 7.1: Everything You Need To Know*; 1993; pp. 212–213 and 238–241.
"GITE X to highlight Arabic computer"; *Middle East News Network*; Sep. 15, 1992.
"Dagesh—A Good Start"; *The Jerusalem Post*; Jan. 29, 1993; p. 12.

*Primary Examiner*—Heather R. Herndon
*Assistant Examiner*—Cliff N. Vo
*Attorney, Agent, or Firm*—Seed and Berry

[57] ABSTRACT

An operating system includes standard resources in a number of different natural languages. The standard resources are utilized to display window elements in windows. The operating system and application programs run on the operating system may utilize the standard resources to generate windows. The application programs may choose the language of the standard resources they use independently of the language of resources the operating system uses.

27 Claims, 9 Drawing Sheets

METHOD AND SYSTEM FOR PROVIDING STANDARD RESOURCES IN DIFFERENT NATURAL LANGUAGES

CROSS-REFERENCE TO RELATED APPLICATION

This application is a continuation of U.S. patent application Ser. No. 08/110,862, filed Aug. 24, 1993, now abandoned.

TECHNICAL FIELD

This invention relates generally to data processing systems and, more particularly, to the use of multilingual standard resources in a data processing system.

BACKGROUND OF THE INVENTION

Most currently available operating systems and application programs are written to display output in a single natural language. A natural language is one that is written and/or spoken and is distinguished from computing languages, such as PASCAL, BASIC or C. Natural languages include languages such as English, French, Arabic and Japanese. Certain software programs are available in multiple versions, wherein each version is written to display output in a different natural language. However, these multiple versions are not integrated into a single product. Operating systems are available that may output text in different natural languages but these operating systems must be internally reset by a software reset or a hardware reboot to switch between natural languages.

SUMMARY OF THE INVENTION

In accordance with a first aspect of the present invention, the method is practiced in a data processing system having processing means, memory means, and a video display. In this method, a first standard resource is stored in the memory means. The first standard resource specifies the appearance of a window element and specifies that the text in the window element is text in a first natural language. A second standard resource is also stored in the memory means. The second standard resource specifies the same appearance of the window elements as specified by the first standard resource but specifies that the text in the window element is in a second natural language. A program is run in the processing mean that uses one of the system resources to display the window element in a window on the video display. The displayed window element has the appearance specified by the standard resource that is used by the program. The window element includes text in the natural language specified by the standard resource that is used by the program.

In accordance with another aspect of the present invention, an operating system is run on the processing means to display a first window on the video display. The window includes window elements with text in a first natural language. An application program is run on the processing means to display a second window on the video display. The second window, in contrast to the first window, includes window elements with text in a second natural language.

In accordance with a further aspect of the present invention, a set of standard resources is stored in the memory means. Each standard resource in the set specifies the appearance of an associated window element that includes text. Each standard resource also specifies the language of the text included in the associated window element. A language is selected for text to be included in the window elements of a window produced by a program that is run on the processing means. The standard resources that specify the language of the text in the window elements as the specified language are used to display the window elements in the window on the video display.

In accordance with yet another aspect of the present invention, a first set of standard resources is stored in the memory means. The first set of standard resources specify appearance of window elements and specify a natural language for text that is included in the respective window elements. A second set of standard resources is stored in the memory means. The second set of standard resources specifies the appearances of window elements and specify a second natural language for the text that is included in the respective window elements. In response to a user request, one of the sets of standard resources is selected for use by the operating system to display window elements in a window on the video display. The appearance of the window elements and the natural language of the text included in the window elements are specified by the selected set of standard resources.

In accordance with an additional aspect of the present invention, sets of standard resources describing window elements are stored in the memory means. Each set of standard resources includes standard resources for a plurality of window elements. Some of the window elements include text. Each set of standard resources has an associated natural language for all text included in the window elements. An initial one of the sets of standard resources chosen for use by the program that is executed on the processing means. The initial one of the sets of standard resources has a first associated natural language. A window is displayed on the video display as directed by the program using the initial one of the sets of standard resources such that some of the window elements include text in the first associated natural language. Subsequently, an alternative one of the sets of standard resources is chosen for use by the program executed on the processing means without rebooting the data processing system. The alternative one of the sets of standard resources has a second associated natural language. The window is displayed on the video display as directed by the program using the alternative one of the sets of standard resources such that some of the window elements include text in the second associated natural language.

In accordance with a further aspect of the present invention, a method is practiced on a data processing system having a memory, a video display and a processor. In this method, a first set of standard resources is stored in the memory. These standard resources specify the appearance of window elements and specify a first natural language for text that appear in the window elements. A second set of standard resources is also stored in the memory. The second set of standard resources specify the appearance of window elements and specify a second natural language for text that appear in the window elements. At least one of the standard resources from the first set of standard resources and at least standard resource from the second set of standard resources are used to display window elements of window for the program on the video display.

DETAILED DESCRIPTION OF THE INVENTION

The preferred embodiment of the present invention provides multilingual standard resources. The preferred embodiment of the present invention is multilingual in that it provides standard resources in a number of different natural languages. A resource is data that is included in a program's executable file but that is not resident in the program's normal data segment. A standard resource is one that is provided by the operating system and is contrasted with a user-defined resource.

The preferred embodiment of the present invention provides selected multilingual standard resources for strings, dialogs and menus that are available both to an operating system and to application programs run on the operating system. The resources are dynamically loaded as required so that they may be shared amongst multiple programs. When a program is loaded into memory for execution, the resources are typically left on disk. Only when a particular resource is needed is it loaded into the internal memory.

Figure 1:
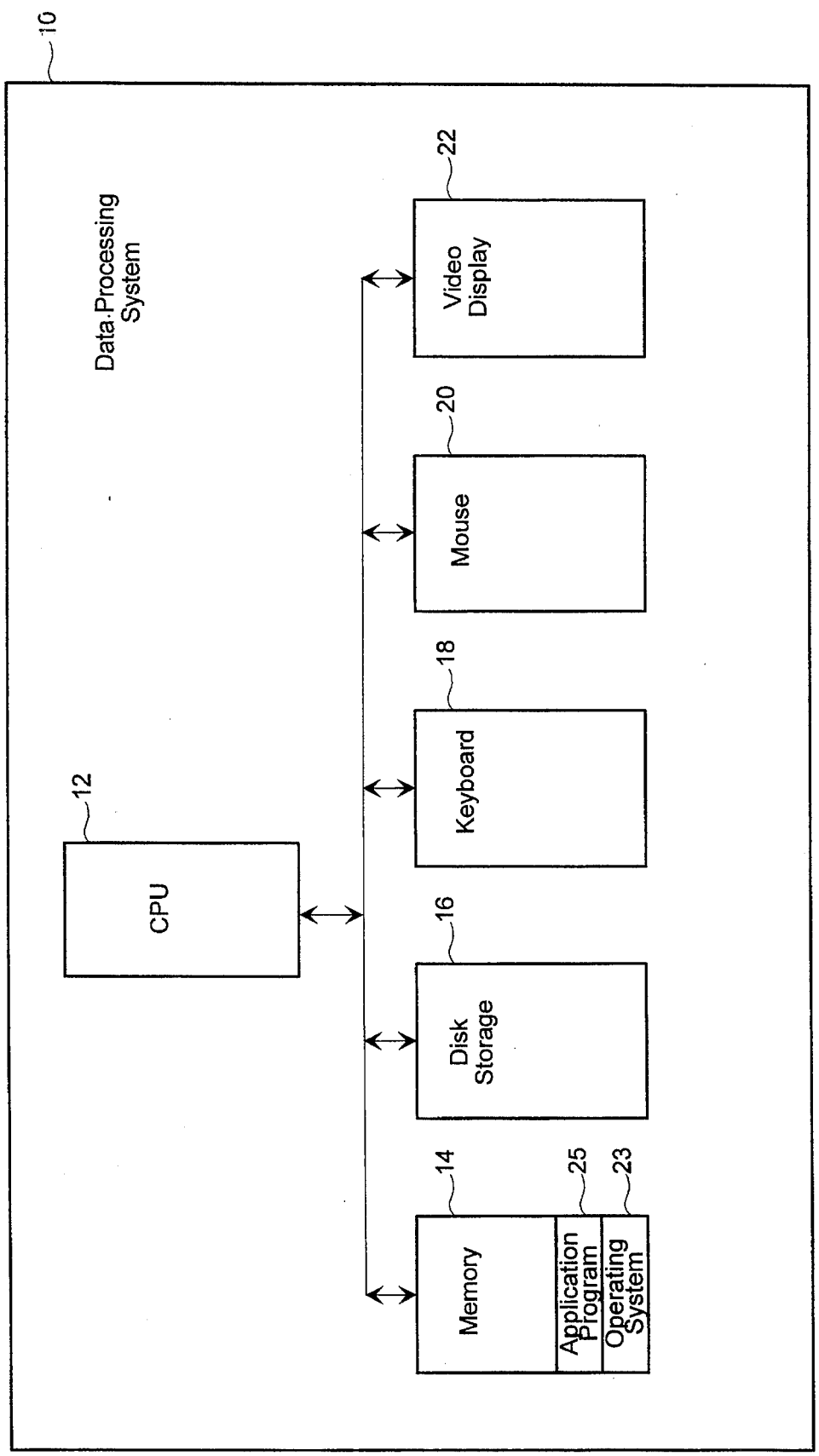
FIG. 1 is a block diagram of a data processing system for practicing a preferred embodiment of the present invention.

FIG. 1 depicts a data processing system 10 that is suitable for practicing the preferred embodiment of the present invention. The data processing system includes a CPU 12 that has access to memory 14 and disk storage 16. The CPU runs programs held in the memory 14. These programs include an operating system 23 and at least one application program 25. The data processing system 10 also includes a keyboard 18, a mouse 20 and video display 22.

Figure 2:
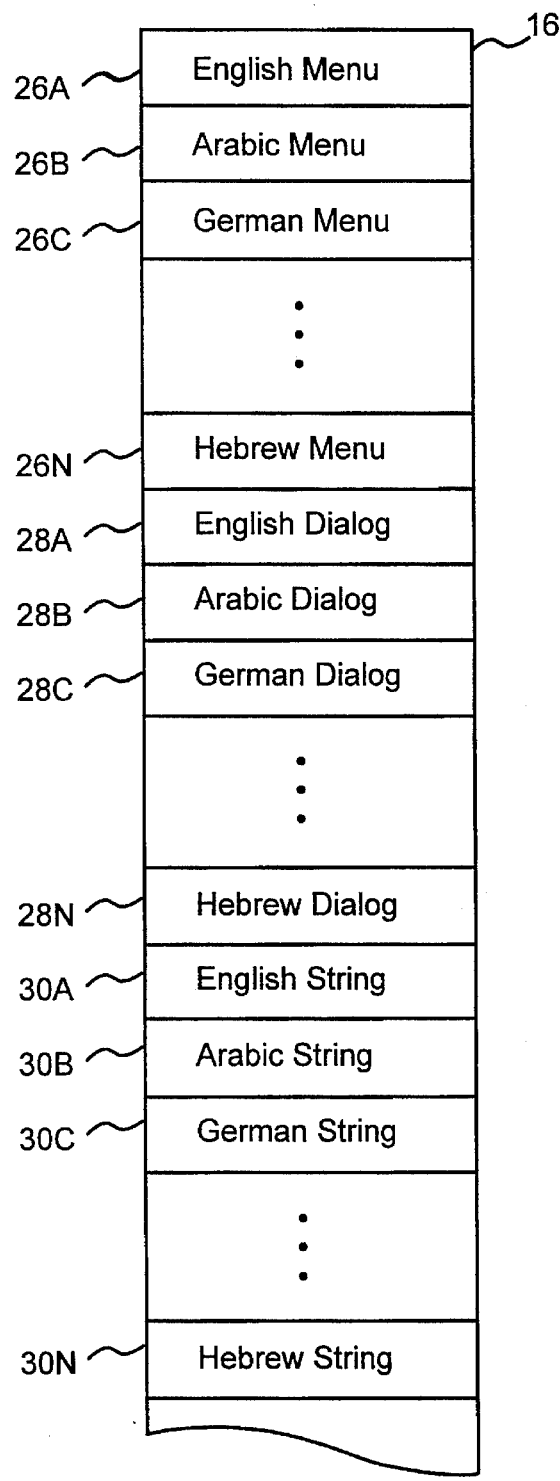
FIG. 2 is a diagram depicting the storage of multilingual standard resources in the disk storage of FIG. 1.

The preferred embodiment of the present invention provides multilingual standard resources by providing alternative copies of a standard resource for a single window element wherein each copy of the standard resource displays text in a different language. FIG. 2 shows an example of the multilingual standard resources stored in disk storage 16. For purposes of the discussion below, it is assumed that the operating system 23 is an embellished version of the Microsoft WINDOWS, Version 3.1, operating system that generally supports the use of standard resources and that has been embellished to facilitate the multilingual standard resources. These embellishments will be described in more detail below.

Only three of the types of standard resources provided by the operating system 23 (FIG. 1) include text. As such, only these standard resources need to be provided in versions for multiple natural languages. The three types of standard resources include menu resources, dialog resources and string resources. These types of standard resources describe the appearance of respective window elements within a window. The sharing of the standard resources amongst multiple programs results in a uniform appearance for windows elements shown by the data processing system 10.

FIG. 2 depicts the standard resources (i.e., menu resources, dialog resources and string resources) that are available in different natural languages. A menu resource, a dialog resource and a string resource are stored in the disk storage 16 for each of the available natural languages. For example, an English menu resource 26A is stored in the disk storage 16. In addition, an English dialog resource 28A and an English string resource 30A are also stored in the disk storage 16. It should be appreciated that the natural languages listed in FIG. 2 are not meant to be exhaustive (i.e., standard resources in other natural languages may also be employed in the present invention). Further, it should be appreciated that there may be more than one type of menu resource, more than one type of dialog resource and more than one type of string resource. Only single types of the respective standard resources are shown for simplicity and clarity. Still further it should be appreciated that standard resources that include text in a same natural language need not be stored together. For example, an English menu resource may be stored after a German dialog resource, which is, in turn, preceded by another English menu resource.

Figure 3:
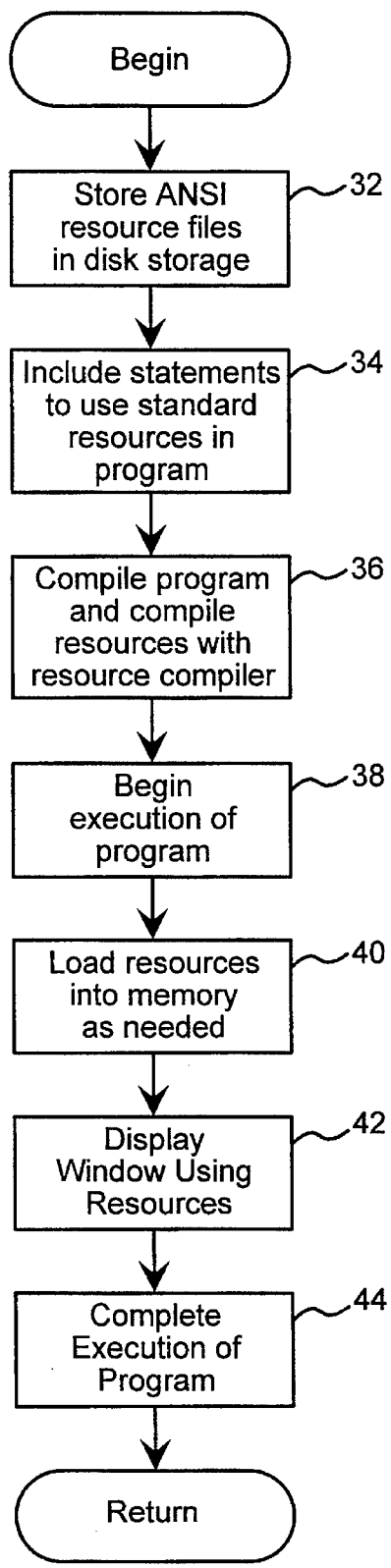
FIG. 3 is a flow chart depicting the steps performed to utilize the multilingual standard resources in the preferred embodiment of the present invention.

FIG. 3 is a flow chart depicting how the multilingual standard resources are used within the preferred embodiment of the present invention. Initially, standard resource scripts (i.e., uncompiled standard resources) are stored in disk storage 16 (see Step 32 in FIG. 3). Generally, the standard resource scripts are in an ANSI format. The sequence in which the resource scripts are stored, as shown in FIG. 2, is intended to be merely illustrative and is not intended to limit the scope of the present invention.

In order for a program to utilize the standard resources, the program must specify the use of standard resources in its code (Step 34 in FIG. 3). Before further examining the standard resources used in the preferred embodiment of the present invention, it is helpful to first to examine how the operating system 23 (FIG. 1) determines the natural language of the standard resources that should be utilized within a program. The program uses the standard resources to display a window. A natural language is associated with the window. Depending upon the program, the language associated with the window may be chosen by a user, the program or the operating system (if the program is not the operating system). The standard resources requested by the program generally reflect the natural language of the associated window. Nevertheless, it should be appreciated that a single window can display a menu in a first natural language along with a dialog in a second natural language. For instance, an application program may explicitly choose to use standard resources having different natural languages. For purposes of clarity, the discussion below will focus on instances wherein all of the selected resources that include text have text in a single natural language.

Figure 4:
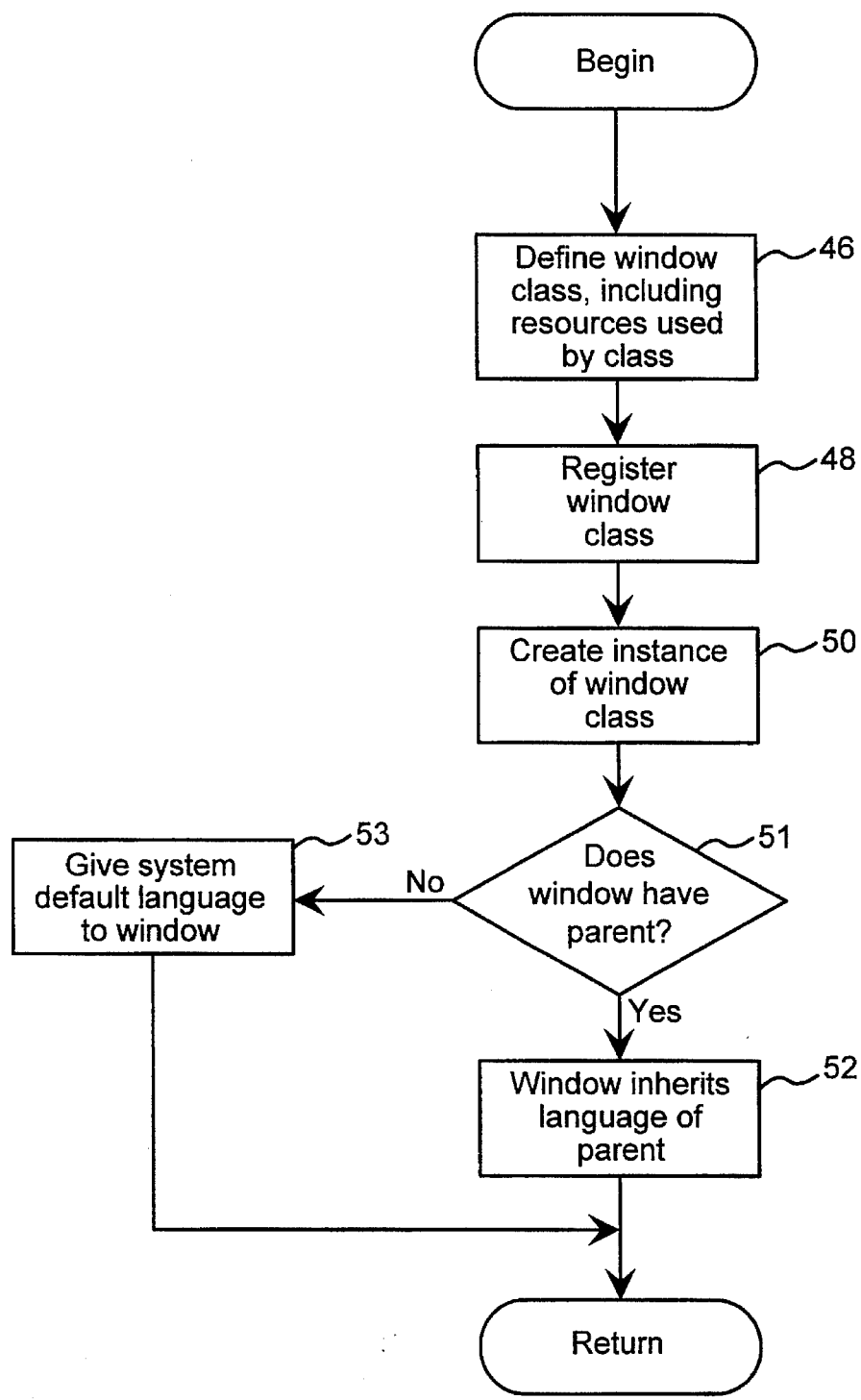
FIG. 4 is a flow chart depicting the steps performed to determine the language associated with a window in the preferred embodiment of the present invention.

FIG. 4 shows a flow chart of the steps performed to determine which standard resources are requested by the program. In order to display the window within the program, the program must first define a window class (Step 46). The window class is then registered (Step 48) and an instance of the window class is created (Step 50) such as commonly performed by applications run on the Microsoft WINDOWS, Version 3.1, operating system. In the preferred embodiment of the preferred invention, however, the natural language for the requested resource must be determined. As such, a determination is made whether the window has a parent window (Step 51). Windows are defined in a parent-child relationship wherein the child window always appears on the surface of its parents. Child windows inherit the properties of the parent window as defined within the parent window class definition. Accordingly, if the window has a parent, the window inherits the natural language of the parent (Step 52). In contrast, if the window does not have a parent, a system default language is assigned to the window (Step 53). The system default language is predefined by the operating system 23. For example, the system default language may be English such that any window that does not have a parent is initially assigned English as its language. In this fashion, the language of the requester's window is found.

Returning to the discussion of the flow chart of FIG. 3, the program is then compiled with a compiler provided by the operating system 23, and the resources are separately compiled within a resource compiler that is also part of the operating system 23 (Step 36 in FIG. 3). The preferred embodiment of the present invention stores type information in a resource type ID about each of the resources (see FIG. 2), wherein the type information is a combination of the type of resource (e.g., menu resource) with the natural language of the resource (e.g., English). Each version of a resource has a distinctive resource type ID and, thus, may be uniquely identified by the resource type ID. The resource type IDs are used to retrieve the requested resources.

Figure 5:
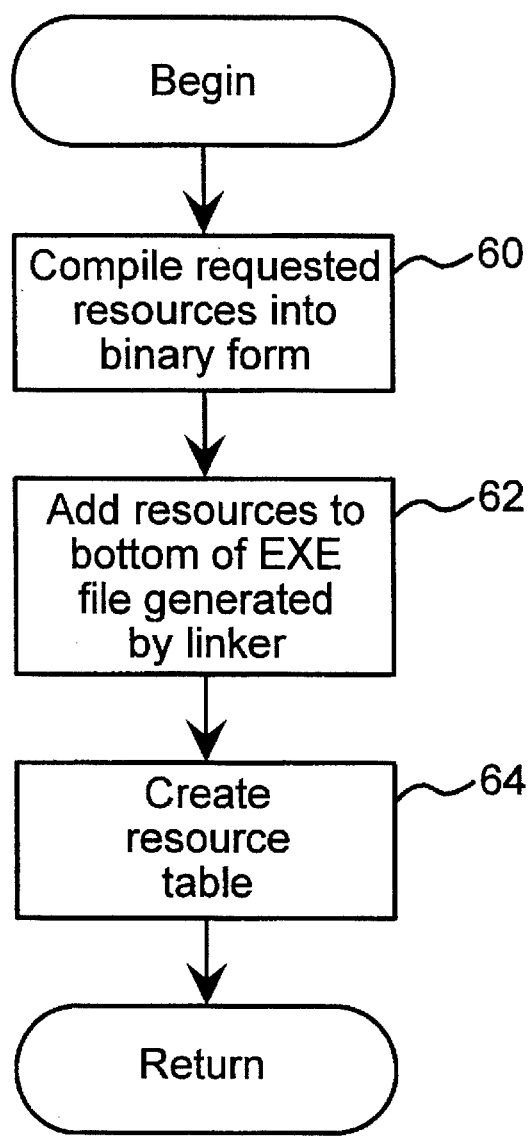
FIG. 5 is a flow chart depicting the steps performed by the resource compiler to resources in the preferred embodiment of the present invention.

The resource compiler performs several additional steps that are shown in the flow chart of FIG. 5. As was mentioned above, the resource scripts are generally stored in an ANSI format. The resource compiler compiles the resource scripts into a binary format so that the resources may be used by the program (Step 60). Once the resource scripts have been compiled into binary form, the resources are added to the bottom of the executable (EXE) file that is generated by the linker of the compiler (Step 62). A resource table is then created within the header of the executable file (Step 64). This resource table will be described in more detail below.

Figure 6:
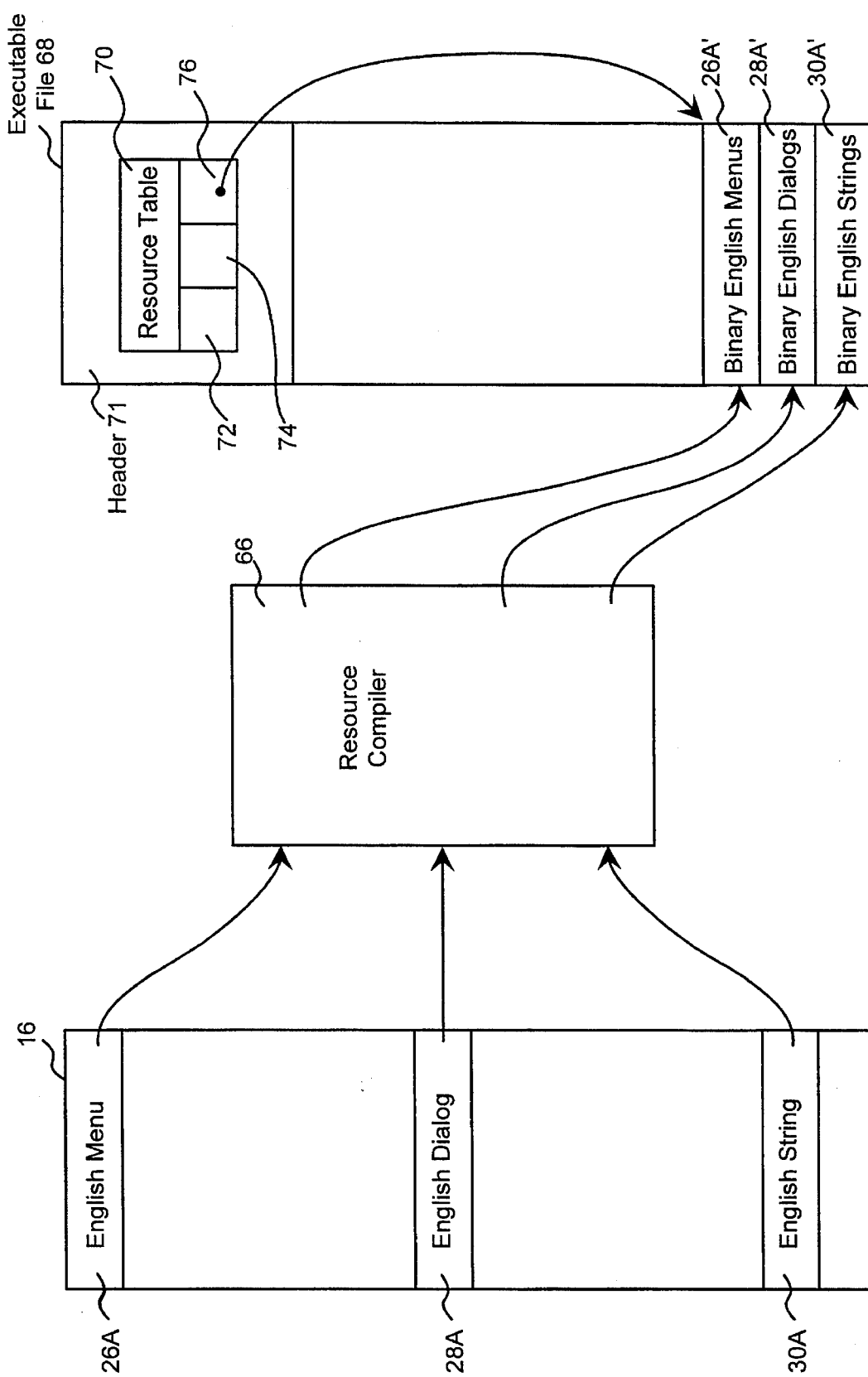
FIG. 6 is a block diagram illustrating the steps performed by the resource compiler compiling resources in the preferred embodiment of the present invention.

FIG. 6 shows an example illustrating the operation of the steps shown in the flow chart of FIG. 5. The example of FIG. 6 assumes that the language of the requesting window is English. The resource compiler 66 compiles the English menu resource script 26A in disk storage 16 to produce a binary English menu resource 26A'. In addition, the resource compiler 66 compiles the English dialog resource script 28A to produce a binary English dialog resource 28A' and compiles the English string resource script 30A to produce a binary English string resource 30A'. By compiling all of these resource scripts 26A, 28A and 30A, the resource compiler 66 performs Step 60 of FIG. 5. The resource compiler then adds the compiled binary resources 26A', 28A' and 30A' to the bottom of the executable file 68 to complete Step 62 of FIG. 5. Lastly, the resource compiler 66 creates the resource table 70 in the header portion 71 of the executable file 68. The resource table 70 includes fields 72, 74 and 76 which will be described in more detail below.

Figure 7:
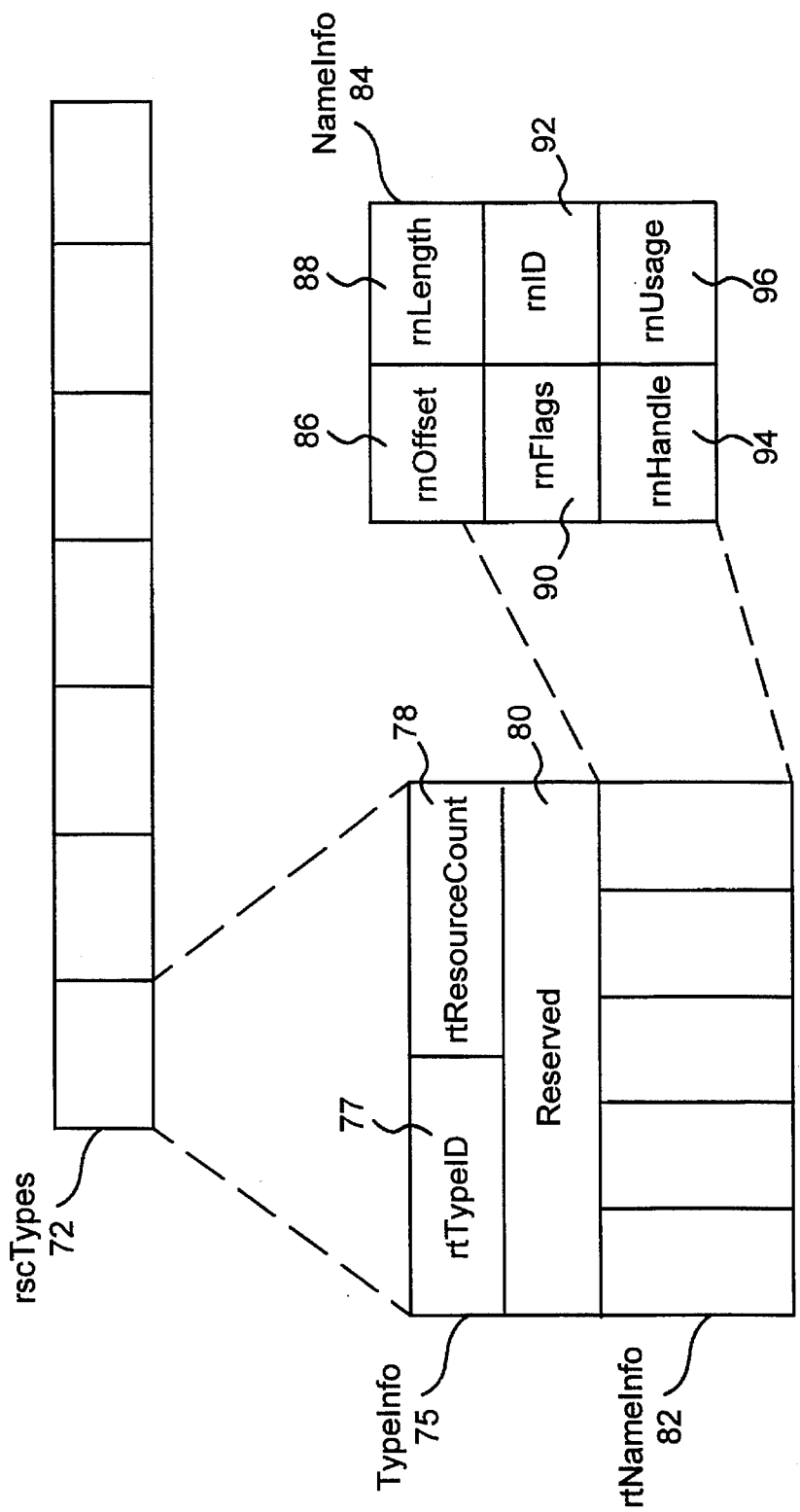
FIG. 7 is a more detailed block diagram of components of the resource table of FIG. 6.

Field 72 of the resource table 70 is shown in more detail in FIG. 7. Field 72 holds an array of TypeInfo structures known as rscTypes. Each TypeInfo structure 75 includes a number of additional fields. In particular, each TypeInfo structure 75 includes an rtTypeID field 77 that specifies a type identifier of a resource. The rtTypeID field 77 identifies the type of resource associated with the TypeInfo structure 75. The types of standard resources available include accelerator tables, bitmaps, cursors, dialog boxes, font components, font directories, cursor directories, icon directories, icons, menus, resource data and string tables. The rtResourceCount 78 specifies the number of resources of the associated type are requested by the program. A reserved field 80 is also included in the TypeInfo structure 75. Lastly, each TypeInfo structure 74 includes a rtNameInfo array 82. Each entry in this array 82 is associated with a particular resource. As such, if there is only a single resource of the type specified in the associated rtTypeID field 77, the rtNameInfo array 82 will only include a single entry.

Each entry in the rtNameInfo array 82 holds a NameInfo structure 84. The NameInfo structure 84 includes six fields. The mOffset field 86 specifies the offset of the standard resource within the resources that are appended to the end of the executable file 68 (FIG. 6). The mLength field 88 specifies the length of the associated standard resource in bytes. The mFlags 90 holds settable flag bits. The mID field 92 specifies or points to a resource identifier for the associated standard resource. The mHandle field 94 and the mUsage field 96 are reserved. From the above discussion, it can be seen that a particular standard resource may be found by first locating the appropriate type info structure 74 within the rscTypes array 72. The named resource then may be found within the rtNameInfo array 82 and located using the mOffset field 86.

As mentioned above, the resource table 70 (FIG. 6) also includes fields 74 and 76. Field 74 specifies the names associated with the resources for the executable file 68. Field 76 specifies an alignment shift that points to the beginning of the resources that are appended to the end of the executable file 68.

Returning again to the discussion of the flow chart of FIG. 3, once the resources have been found and compiled to produce the file format shown in FIGS. 6 and 7, execution of the program may then begin (Step 38). As was discussed above, the resources are dynamically loaded into memory 14 (FIG. 1) from disk storage 16 as needed (step 40). The compiled and retrieved resources are used to display the associated window elements in the window (Step 42). Execution of the program may then continue until completed (Step 44).

Figure 8:
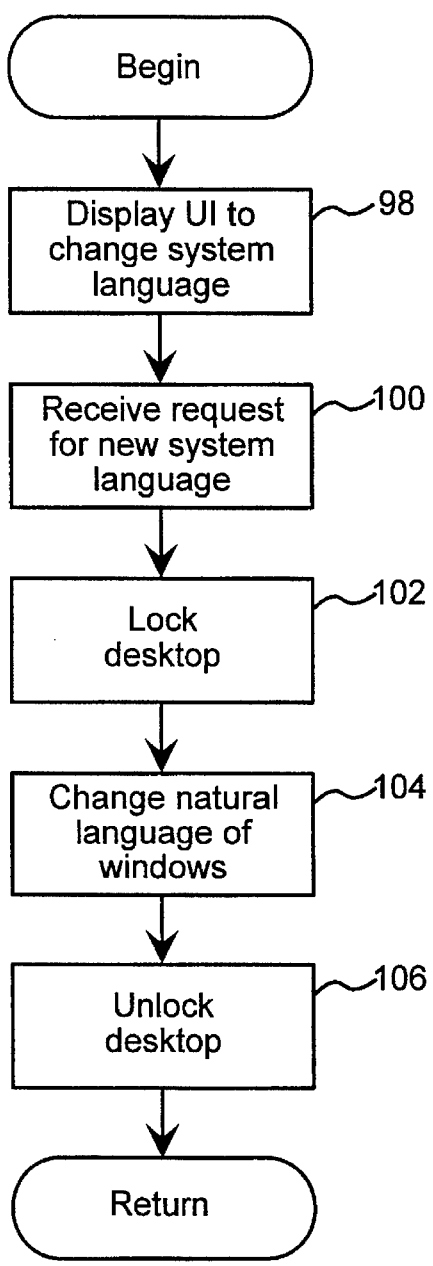
FIG. 8 is a flow chart illustrating the steps performed to change the system language of the operating system.

The natural language selected by a program for a window need not remain fixed; rather, the natural language may change. FIG. 8 shows a flow chart of the steps performed by the preferred embodiment of the present invention to change the natural language for user interfaces in the operating system 23 (FIG. 1). The operating system 23 displays a user interface for changing the natural language: this user interface may take a number of different forms including a drop-down list that lists each of the possible natural languages for which standard resources are provided (Step 98). The user makes a selection from the user interface and the user request is then forwarded to the operating system 23 to be used as the new system natural language (Step 100). The desktop is locked so as to ensure that it will not be moved and to provide an indication to application programs that the system language is changing (Step 102). The system then changes the natural language associated with each of the windows generated by the operating system (Step 104). Lastly, the desktop is unlocked (step 106).

Figure 9:
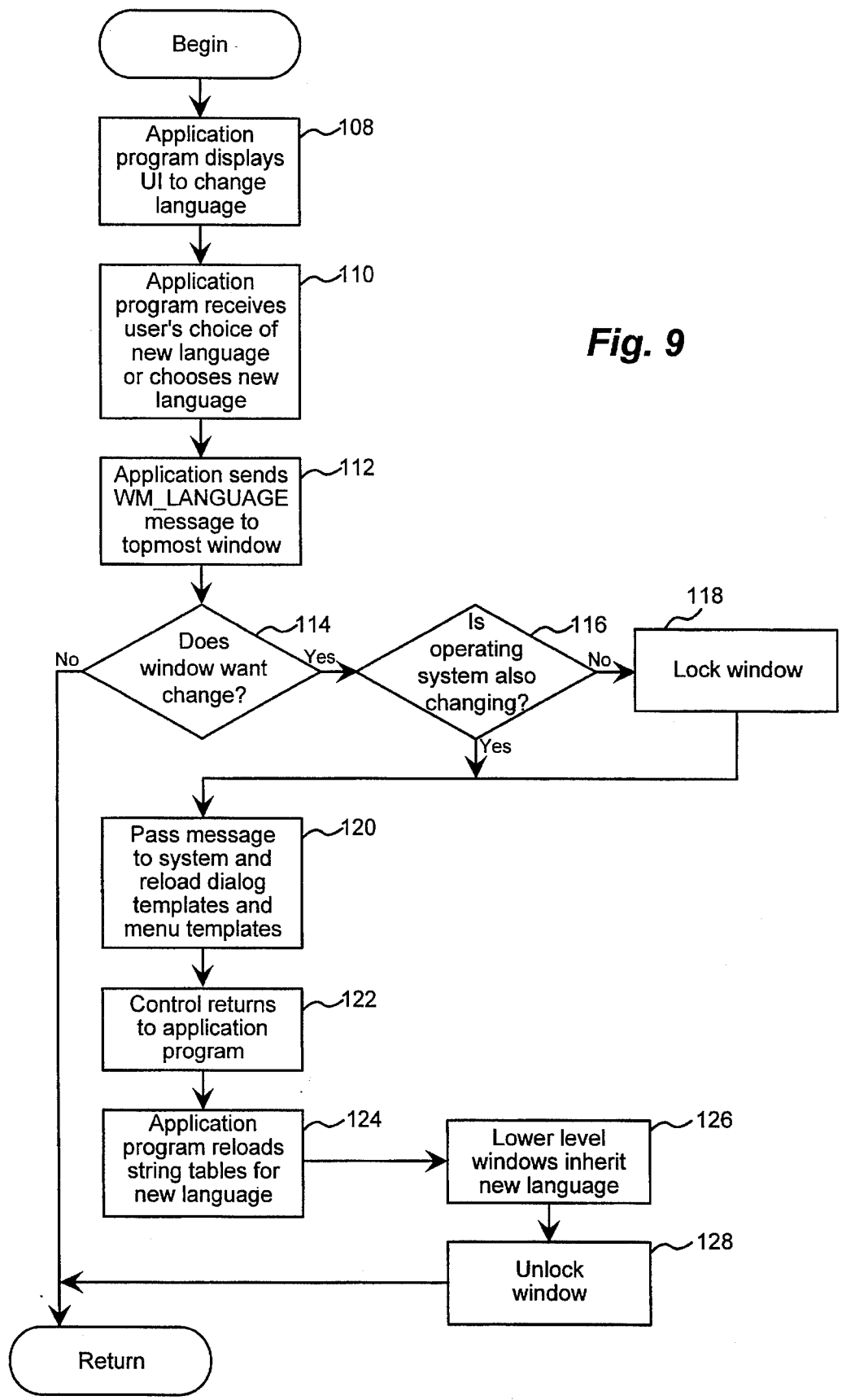
FIG. 9 a flow chart illustrating the steps performed to change the language of windows in an application program in the preferred embodiment of the present invention.

FIG. 9 is a flow chart illustrating the steps performed to change the natural language of an application window. Like the operating system, an application program may display a user interface to change the language (Step 108). It has the option of displaying such an interface. The application program may either receive the user's choice of the new language or choose a new language on its own (Step 110). The application then sends a WM_LANGUAGE message to the top-most window provided in the application (Step 112). WM_LANGUAGE is a windows message that specifies a change in the natural language of the window (Step 112). This message is sent to the top-most window (because all lower level windows will inherit the language when the top-most window is changed). The top-most window has the option of accepting the change in the natural language of the window (Step 114). If the window does not want the change, no further steps are taken. In contrast, if the window wants the change, it is determined whether the operating system is also changing natural languages (Step 116). If the operating system is not changing natural languages, the window is locked (Step 118).

The message is sent to the operating system 23 (FIG. 1). The operating system may reload the dialog resources and menu resources for the chosen new language as the new resources for the application program, or the application program may tell the operating system that it wants to load the resources for the new language and then load the resources for the new language (Step 120). After these resources are loaded, control returns to the application program (Step 122) and the application reloads string resources for the new language (Step 124). As a result of the change in language for the top-most level window, the lower-level windows inherit the new language (Step 126). It should be noted that a window has the option of passing or not passing the change on to its children so that they inherit the new language. The topmost application window is then unlocked (step 128).

By providing multilingual standard resources, the preferred embodiment of the present invention enhances the usefulness of a single software product. The benefits of the multilingual approach may be shared by both the operating system and applications run on the operating system. Moreover, this multilingual capability may be easily integrated into existing operating systems such as Microsoft WINDOWS, Version 3.1 operating system.

While the present invention has been described with reference to a preferred embodiment thereof, those skilled in the art will appreciated that various changes in scope and detail may be made without departing from the spirit and scope of the present invention as defined in the appended claims.

We claim:

1. In a data processing system having processing means running an operating system, memory means and a video display, a method, comprising the steps of:

storing a first standard resource in the memory means, said first standard resource being provided by the operating system and specifying appearance of a non-textual component of a window element of a window and specifying that text in the window element is in a first natural language;

storing a second standard resource in the memory means, said second standard resource being provided by the operating system and specifying the same appearance of the non-textual component of the window element as specified by the first standard resource but specifying that text in the window element is in a second natural language; and running a program on the processing means that uses one of the first standard resource or second standard resource to display the window element in a window on the video display, said non-textual component of the window element having the appearance specified by the standard resource used by the program and including text in the natural language specified by the standard resource used by the program.

2. The method recited in claim 1 wherein the program is the operating system and the step of running the program on the processing means that uses one of the first standard resource or second standard resource to display the window element in the window on the video display further comprises the step of running the operating system on the processing means that uses one of the first standard resource or second standard resource to display the window element in the window on the video display.

3. The method recited in claim 1 wherein the program is an application program and the step of running the program on the processing means that uses one of the first standard resource or second standard resource to display the window element in the window on the video display further comprises the step of running the application program on the processing means that uses one of the first standard resource or second standard resource to display the window element in the window on the video display.

4. The method recited in claim 1 wherein the method further comprises the step of storing a third standard resource in the memory means, said third standard resource being provided by the operating system specifying appearance of a non-textual component of an additional window element and specifying that text in the additional window element is in the first natural language and wherein the step of running the program on the processing means further comprises the step of running the program on the processing means that uses the first and third standard resources to display the window element and the additional window element, said non-textual component of said window element having the appearance specified by the first standard resource and including text in the first natural language and said non-textual component of said additional window element having the appearance specified by the third standard resource and including text in the first natural language.

5. The method recited in claim 1, further comprising the step of switching the standard resource used by the program run on the processing means so that the program uses the previously unused standard resource to display the window element on the video display, said non-textual component of said window element having the appearance specified by the previously unused standard resource and including text in the natural language specified by the previously unused standard resource.

6. The method recited in claim 1 wherein the program decides what standard resource to use to display the window element based on a choice by a user of one of the standard resources.

7. The method recited in claim 6, further comprising the step of displaying a user interface on the video display to prompt the user to choose one of the standard resources to be used by the program.

8. The method recited in claim 1 wherein the window element is a menu.

9. The method recited in claim 1 wherein the window element is a dialog box.

10. In a data processing system having processing means, memory means and a video display, a method comprising the steps of:

storing a set of standard resources in memory means, each standard resource in the set specifying appearance of an associated window element that includes text and a language of the text included in the associated window element, wherein at least two of said standard resources specify different languages of the text;

in a program run on the processing means, selecting a language for text to be included in window elements of a window produced by the program, said program having an associated executable file with a data segment holding data; and adding the standard resources, that specify the language of the text included in the window elements of the window as the selected language, to the executable file of the program to display the window elements in the window on the video display.

11. The method recited in claim 10 wherein the program run on the processing means is an operating system.

12. The method recited in claim 10 wherein the program run on the processing means is an application program.

13. The method recited in claim 10 wherein the step of storing the set of standard resources in the memory means further comprises the step of storing a standard resource in the memory means that specifies appearance of an associated menu that includes text and specifies the language of the text included in the associated menu.

14. The method recited in claim 10 wherein the step of storing the set of standard resources in the memory means further comprises the step of storing a standard resource in the memory means that specifies appearance of an associated dialog box that includes text and specifies the language of the text included in the associated dialog box.

15. The method recited in claim 10 wherein the step of storing the set of standard resources in the memory means further comprises the step of storing a standard resource in the memory means that specifies appearance of an associated string that includes text and specifies the language of the text included in the string.

16. The method recited in claim 10 wherein the step of selecting the language for the text to be included in the window elements of the window produced by the program further comprises the steps of:

displaying a user interface that prompts a user for a choice of language for the text to be included in the window elements of the window produced by the program; and selecting the language chosen by the user as the language of the text to be included in the window elements of the window produced by the program.

17. The method recited in claim 10 wherein the step of selecting the language for the text to be included in the window elements of the window produced by the program further comprises the step of selecting a system provided default language for the text to be included in the window elements of the window produced by the program.

18. In a data processing system having memory means, a video display and processing means running an operating system, a method comprising the steps of:

storing a first set of standard resources provided by the operating system in the memory means, said first set of standard resources specifying appearance of both textual and non-textual components of window elements and that specify a natural language for the textual components in the window elements as a first natural language;

storing a second set of standard resources provided by the operating system in the memory means said second set of standard resources specifying appearance of both textual and non-textual components of window elements and that specify the natural language for text in the window elements as a second natural language; and in response to a user request, selecting one of the sets of standard resources for use by the operating system to display the window elements in a window on the video display, wherein the appearance and the natural language of the text in the window elements are specified by the selected set of standard resources.

19. The method recited in claim 18, further comprising the step of displaying a user interface on the video display that provides a user with an option of requesting the first natural language or the second natural language for the text in the window elements.

20. In a data processing system having processing means, a video display and a memory means having a program for displaying a window, said program having an executable file, a method comprising the steps of:

storing sets of standard resources describing window elements in the memory means wherein each set of standard resources includes standard resources for a plurality of window elements, some of which include text, and each set of standard resources has an associated natural language for all text included in the window elements;

choosing an initial one of the sets of standard resources having a first associated natural language for use by the program run on the processing means;

displaying a window on the video display as directed by the program using the initial one of the sets of standard resources such that some of the window elements include text in the first associated natural language, said initial one of the sets of standard resources being added to the executable file of the program;

choosing an alternative one of the sets of standard resources having a second associated natural language for use by the program run on the processing means without rebooting the data processing system, said alternative one of the sets of standard resources being added to the executable file of the program; and displaying the window on the video display as directed by the program using the alternative one of the sets of standard resources such that some of the window elements include text in the second associated natural language.

21. The method recited in claim 20 wherein the program is an operating system.

22. The method recited in claim 20 wherein the program is an application program.

23. The method recited in claim 20, further comprising the step of displaying a user interface on the video display that provides a user with choices of natural languages for the sets of standard resources to be used by the program run on the processing means and wherein the step of choosing the initial one of the sets of standard resources having the first associated natural language for use by the program run on the processing means further comprises the step of choosing the initial one of sets of standard resources chosen by the user via the user interface and having the first associated natural language for use by the program run on the processing means.

24. The method recited in claim 20, further comprising the step of displaying a user interface on the video display that provides a user with choices of natural languages for the sets of standard resources to be used by the program run on the processing means and wherein the step of choosing the alternative one of the sets of standard resources having the second associated natural language for use by the program run on the processing means further comprises the step of choosing the alternative one of sets of standard resources chosen by the user via the user interface and having the second associated natural language for use by the program run on the processing means.

25. The method recited in claim 20 wherein the step of choosing the initial one of the sets of standard resources further comprises the step of choosing a system-provided default set of standard resources having the first associated natural language for use by the program run on the processing means.

26. In a data processing system having memory, a video display and a processor running an operating system and a program that displays a window having window elements, a method comprising the steps of:

storing a first set of standard resources provided by the operating system in the memory that specify appearance of both textual and non-textual components of the window elements and that specify a first natural language for the textual components in the window elements;

storing a second set of standard resources provided by the operating system in the memory that specify appearance of both textual and non-textual components of the window elements and that specify a second natural language for the textual components in the window elements;

adding at least one standard resource from the first set of standard resources and at least one standard resource from the second set of standard resources to the executable file of the program to display ones of the windows elements of the window for the program on the video display.

27. The method recited in claim 29 wherein the step of adding at least one standard resource from the first set of standard resources and at least one standard resource from the second set of standard resources to the executable file of the program is performed in response to a user selection of desired standard resources.

* * * * *

UNITED STATES PATENT AND TRADEMARK OFFICE
CERTIFICATE OF CORRECTION

PATENT NO. : 5,499,335
DATED : March 12, 1996
INVENTOR(S) : David M. Silver and John R. Windsor It is certified that error appears in the above-indentified patent and that said Letters Patent is hereby corrected as shown below:

In column 9, claim 18, line 65, following "means", please insert--,--.

In column 12, claim 27, line 15, following "claim", please delete "29" and insert therefor--26--.

Signed and Sealed this

Twenty-eighth Day of May, 1996

*Attest:*

BRUCE LEHMAN

*Attesting Officer*     *Commissioner of Patents and Trademarks*